United States Patent [19]
Marko et al.

[11] Patent Number: 5,361,628
[45] Date of Patent: Nov. 8, 1994

[54] SYSTEM AND METHOD FOR PROCESSING TEST MEASUREMENTS COLLECTED FROM AN INTERNAL COMBUSTION ENGINE FOR DIAGNOSTIC PURPOSES

[75] Inventors: Kenneth A. Marko, Ann Arbor; Bruce D. Bryant, Royal Oak; Nathan R. Soderborg, Ann Arbor, all of Mich.

[73] Assignee: Ford Motor Company, Dearborn, Mich.

[21] Appl. No.: 100,794

[22] Filed: Aug. 2, 1993

[51] Int. Cl.$^5$ ............................................. G01M 15/00
[52] U.S. Cl. ........................................ 73/116; 395/913; 73/117.2
[58] Field of Search ................... 73/116, 117.2; 364/424.03, 551.01; 382/14; 395/21, 913

[56] References Cited

U.S. PATENT DOCUMENTS

| | | | |
|---|---|---|---|
| 5,041,976 | 8/1991 | Marko et al. | 364/424 |
| 5,060,279 | 10/1991 | Crawford et al. | 382/14 |
| 5,193,513 | 3/1993 | Marko et al. | 123/571 |
| 5,200,899 | 4/1993 | Ribbens et al. | 364/551.01 |

*Primary Examiner*—Robert Raevis
*Assistant Examiner*—James M. Olsen
*Attorney, Agent, or Firm*—Sterne, Kessler, Goldstein & Fox

[57] ABSTRACT

A system and method for processing test measurements collected from an internal combustion engine that is cold-tested for diagnostic purposes. Test measurements are collected from an engine. The test measurements are "pre-processed" by filtering and subsampling techniques so that Principle Component Analysis can be applied to condense the quantity of test measurements while still retaining a statistically accurate indication of a majority of the original measurements. The pre-processed test measurements are then passed through one or more classifiers including: a Neural Network classifier, a Fuzzy Logic classifier, a cluster-based classifier (or "Spherical" classifier) and a Genetic Program classifier. Results from these classifiers can be used to obtain a verdict about an engine (i.e., whether the engine is "normal" or "faulty").

20 Claims, 14 Drawing Sheets

5,361,628

SYSTEM AND METHOD FOR PROCESSING TEST MEASUREMENTS COLLECTED FROM AN INTERNAL COMBUSTION ENGINE FOR DIAGNOSTIC PURPOSES

BACKGROUND OF THE INVENTION

1. Field of the Invention

The present invention relates to processing test measurements collected from a multi-cylinder internal combustion engine to yield diagnostic results, and more specifically to a system for processing cold-test data collected from an internal combustion engine for optimum determination of engine condition.

2. Related Art

Testing newly manufactured internal combustion engines is often performed by "cold test" (i.e., cranking the engine at a prescribed speed via an external motor, without spark or fuel). Measurements (such as electrical signals of an engine parameter, e.g., oil pressure, intake exhaust pressure, crankshaft torque, etc.) are then taken from the engine and compared to a set of known rules (e.g., waveforms) that have been established to represent a properly running engine.

When a particular engine part is faulty, it will typically produce a symptom that does not match the rule, thereby signifying it is not functioning properly. For example, the torque waveform (analog representation) of an engine being monitored typically produces a signature that corresponds to compression in a particular cylinder. If that signature does not exist, it suggests that something is malfunctioning (e.g., a spark plug is missing or piston ring is missing, etc.).

The problem associated with performing analysis by viewing waveforms is that rules must be established that indicate what is a malfunctioning condition. There may be several rules needed to identify a single problem and then several more rules developed to diagnose the problem. Additionally, the waveform from one problem (e.g., missing piston ring) might look exactly the same as a distinct problem (e.g., missing spark plug), making it very difficult to distinguish two different problems that have like symptoms. As a result it is necessary to perform further time consuming and intricate tests to isolate and identify the underlying fault. Therefore, there is a need to precisely distinguish faults that display very similar symptoms without performing additional time consuming tests.

Additionally, if a new fault arises that was not considered, a rule may not exist to identify this "fault" as a true problem. As a result defects in engines will be missed and as a consequence can create significant post manufacturing costs. Thus, there is a need to be able to detect faults that deviate from any observed and known rule.

Furthermore, it is time consuming to develop a conventional system for testing an engine and performing diagnostics. For instance, it typically takes several months to develop a conventional engine analysis system. The mason is that a significant number of "rules" must be generated to match a specific engine design. Additionally, if the engine is altered or redesigned slightly and a data base is already established, it may take several weeks to modify the data base. Therefore, there is a need to reduce the time it takes to develop an engine analysis system for diagnostic purposes.

SUMMARY OF THE INVENTION

The present invention is a system and method for processing test measurements collected from newly assembled internal combustion engines that are cold-tested (the engine is cranked by an external motor without spark or fuel) for diagnostic purposes. The present invention is able to detect and identify defects in engine parts and may also be used for detecting manufacturing process defects, degradation, and other deviations in engines.

The present invention operates as follows. Test measurements are collected from an engine. The test measurements are "pre-processed" by filtering and subsampling techniques so that Principle Component Analysis (PCA) can be applied to condense the quantity of test measurements, while still retaining a statistically accurate indication of a majority of the original measurements. The pre-processed test measurements are then passed through several classifiers including: a Neural Network classifier, a Fuzzy Logic classifier, a cluster-based classifier known as the "Spherical Classifier" and a Genetic Program classifier. Results from these classifiers can be used to obtain a verdict about the engine. That is, the classifiers are configured to detect faults (whether there is a problem) and/or identify the fault (what is causing the problem). Classifiers can also be combined in a voting scheme to produce a more statistically accurate verdict of an engine than can be provided by a single classifier. Additionally, results of the classifiers for a group of engines can be analyzed simultaneously for trend monitoring.

The present invention is a significant improvement over conventional diagnostic systems for tile following reasons: Preprocessing of test measurements is performed through the use of PCA, which statistically concentrates measurements into a succinct set of parameters. PCA indicates exactly how much information from the original measurements are retained, and PCA typically retains significantly more measurement information than conventional preprocessing techniques such as feature detection (amplitude, phase, zero-crossing, etc.) or spectral techniques (Fourier transforms).

A further advantage of the present invention is adaptability. The present invention can be readily adapted to account for modifications made in engine configuration, instrumentation or manufacturing trends. It can also be "trained" or adapted to detect and identify previously unseen or unforeseen faults. Adapting the test system to engine modifications can be performed in hours or days rather than weeks or months as required by conventional fault detection and identification systems.

Another advantage of the present invention is that adjustments can be made in the sensitivity of several aspects of the classifiers which provide the operator of the present invention a great deal of flexibility to select a final verdict (e.g., pass/fail) for an engine.

BRIEF DESCRIPTION OF THE DRAWINGS

The novel features of tile invention are set forth with particularity in the appended claims. The invention itself, however, both as to its organization and method of operation, together with further objects and advantages thereof, may best be understood by reference to the following description taken in conjunction with the accompanying drawings, in which:

Figure 1:
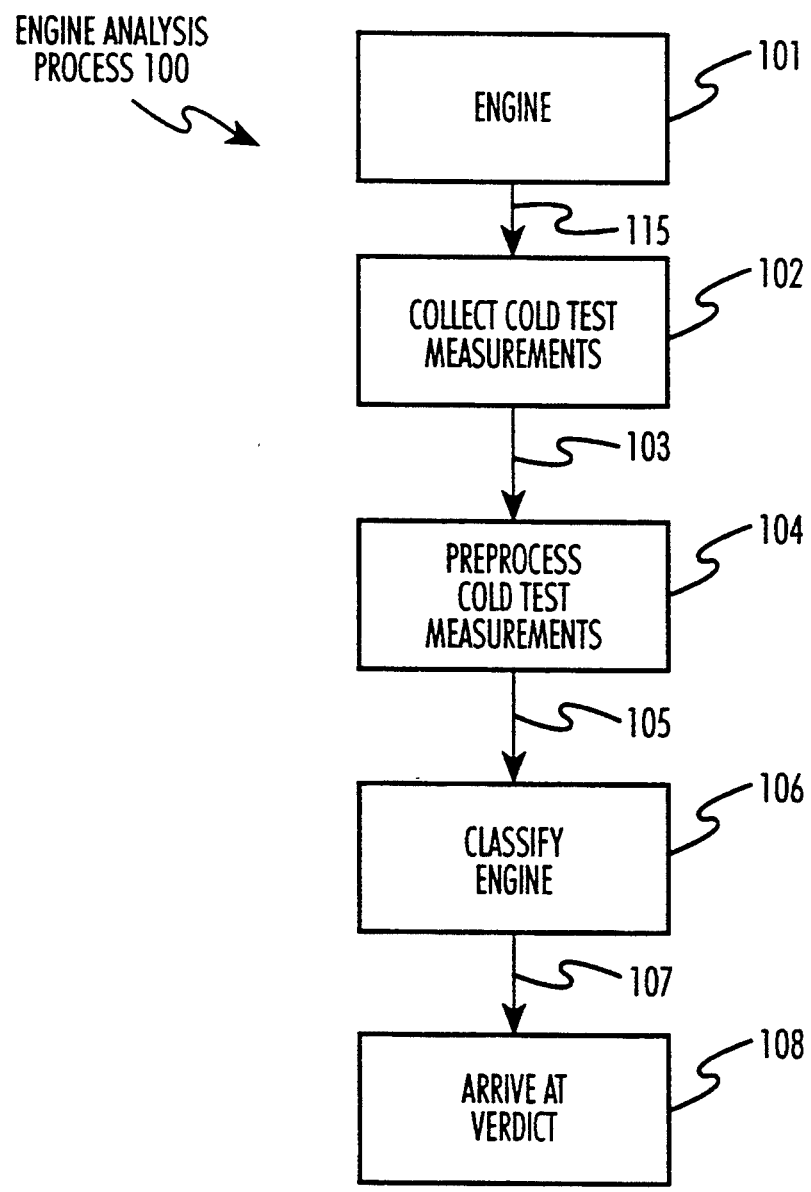
FIG. 1 is a high level, data flow block diagram of an engine analysis process 100 in accordance with a preferred embodiment of the present invention.

The left-most digit of a reference number identifies the drawing in which the reference number first appears.

DETAILED DESCRIPTION OF THE PREFERRED EMBODIMENTS 1.0 Engine Analysis System and Method FIG. 1 is a high level, data flow block diagram of an engine analysis process 100 in accordance with a preferred embodiment of the present invention. Briefly, the analysis process 100 includes collecting cold test measurements 102, preprocessing cold test measurements 104, classifying the engine 106, and arriving at a verdict 108. Blocks 102, 104, 106 and 108 in FIG. 1, represent the operational steps of the engine analysis process according to the present invention and will generally be referred to as "steps." Arrows 103, 105, 107 and 115 between steps 102, 104, 106 and 108 may be implemented as wires, such as electrical bus wires, which transport electrical signals. Alternatively, one or more of arrows 103, 105 and 107 may represent communication (e.g. data flow arrow s) between software routines, particularly when the present invention (or components of the present invention) is implemented as a computer-controlled process as in the preferred embodiment. The overall operation of the engine data analysis process 100 will now be described in more detail.

1.1 Collecting Cold Test Measurements

Referring to FIG. 1, in step 102, test measurements are collected from an engine 101 under-test. The engine 101 is cranked at low speed without spark or fuel (cold test). Cold testing an engine for diagnostic purposes is generally well understood by those skilled in the art. For purposes of illustrating the present invention, the engine 101 is herein considered to be a 4-cylinder combustion engine of a type typically employed in cars and light trucks. It should be understood, however, that the data analysis process 100 can be employed to monitor other combustion engine designs (e.g., 4, 6, 8 and greater cylinders).

In the preferred embodiment, test measurements are collected for one engine cycle, which is two revolutions for a 4-cycle engine. However, it is possible to collect test measurement for more or less than one engine cycle. As understood by those skilled in the art, test measurements are collected in sampled analog format (i.e., raw "data" waveforms). In the preferred embodiment test measurements are collected once per degree of engine revolution for a total of 720 total points per waveform. Test measurements are collected from four diagnostic indicators (e.g. parameters) including crankshaft torque, intake pressure, exhaust pressure and oil pressure. Oil pressure test measurements are filtered into an Alternating Current (AC) (remove DC component) component waveform to produce a fifth diagnostic indicator, called the "dynamic oil pressure." Thus, five diagnostic indicator measurement files are collected, each having 720 total points per waveform as a result of collecting cold test measurements. Test measurements can also be collected from other diagnostic indicators such as acoustic sensors, engine mounted torque sensors, in-cylinder pressure sensors, crankcase air pressure sensors, etc.

1.2 Preprocessing Cold Test Measurements

Figure 2A:
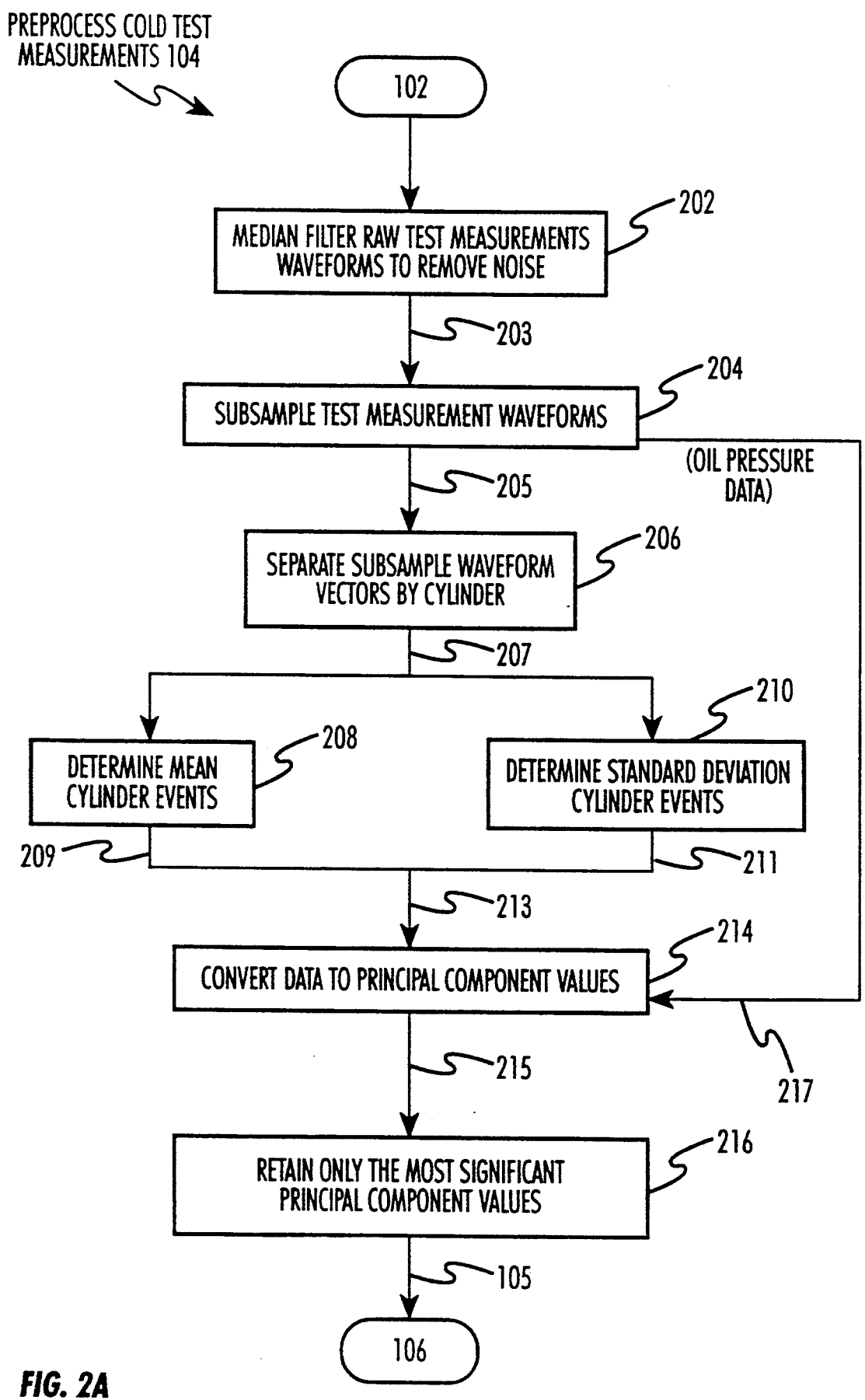
FIG. 2A is a flow chart illustrating the steps of operation of the preprocess technique referred to in FIG. 1.
Figure 2B:
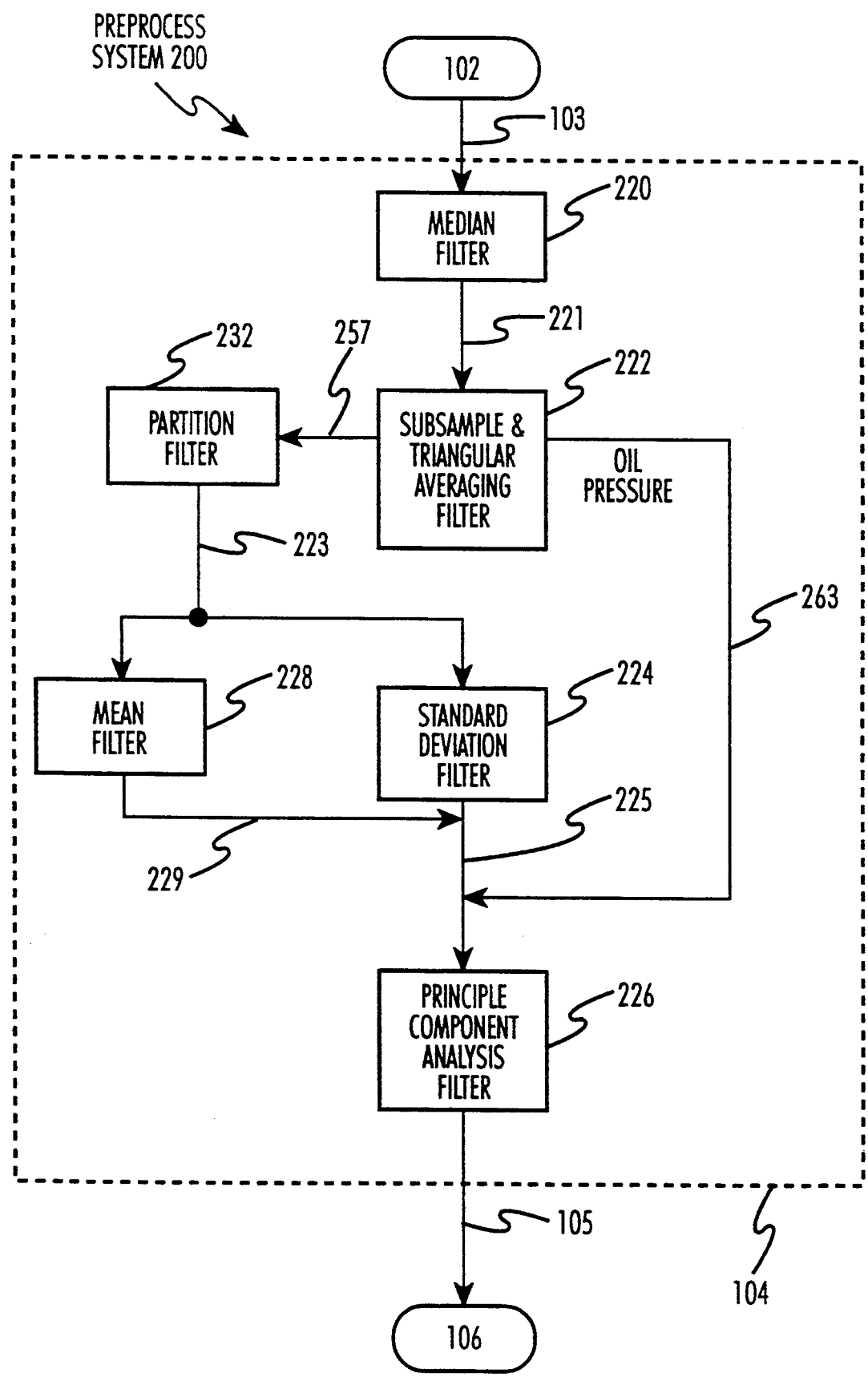
FIG. 2B is a block diagram illustrating the primary components of the preprocess technique.

In step 104, test measurements (parameters) collected from engine 101 are preprocessed. Generally, preprocessing 104 condenses raw "data" measurement waveforms into a vector of relevant parameters. Preprocessing of test measurements will be described with reference to FIGS. 2A and 2B. FIG. 2A is a flow chart illustrating the operational steps of the preprocess technique 104 in accordance with the present invention. FIG. 2B is a block diagram of a preprocess system 200 that is used to preprocess cold test measurement signals received from engine 101 in accordance with step 104 of FIG. 1.

Referring to FIG. 2B, preprocess system 200 includes a plurality of filters and related elements including: a median filter 220, a triangular averaging window filter/partition 222, a mean filter 228, a standard deviation filter 224 and a principle component filter 226. It should be noted that arrows 103, 221,223,225,229, and 105 between elements 220, 222, 224,226, 228 represent data flow in the form of digital signals (in the case of a computer implemented process between subroutines in software as performed in the preferred embodiment), busses (in the case of a hardware based system) or a combination of busses and signals in the case of a hybrid system. In the preferred embodiment the preprocess system 200 is a computer implemented process (performed in software) that has the capability to read and write information to a memory unit (not shown). The functionality of the preprocess system 200 will be described in more detail with reference to FIG. 2A.

Referring to FIG. 2A, in step 202 raw measurement waveforms are median filtered to remove artifacts of electrical noise and mechanical vibration. This is accomplished by passing the cold test measurement signals 103 representing cold test data through median filter 220 as shown in FIG. 2B.

Figure 3:
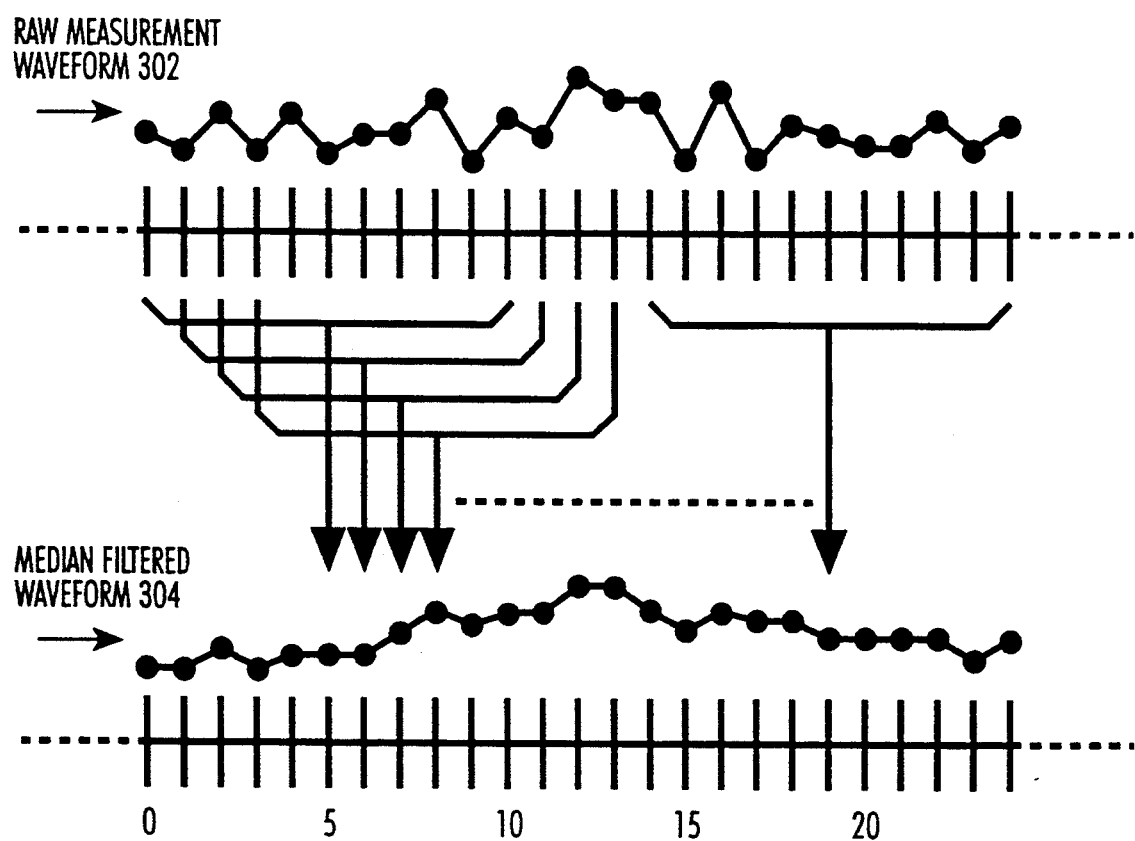
FIG. 3 depicts an example representation of a generic raw measurement waveform collected from an engine. A median filtered version of the same waveform is also presented.

FIG. 3 depicts an example representation of a generic raw measurement waveform 302 collected from engine 101 that is median filtered to produce a median filtered waveform 304. For example, any point N of median filtered waveform 304 is the median value of points N−5 through N+5 of the unfiltered waveform 302. The averaging length (e.g., ±5 in the example above) is adjustable depending on the waveform and the desired amount of filtering. In the preferred embodiment, all five diagnostic measurement waveforms (crankshaft torque, intake pressure, exhaust, oil pressure and dynamic oil pressure) are median filtered separately to produce five 720-point vectors representative of the filtered waveform 304. This information is then passed to step 204 and is shown in FIG. 2B as signal 221.

Referring back to FIG. 2A, in step 204 individual median filtered waveforms (vectors) 304 are subsampled. Subsampling can be used to reduce the number of points in the waveform 304 while retaining its general shape and not losing a significant amount of information. In the preferred embodiment, subsampling is performed by the triangular averaging window filter 222 whose width and slope can be adjusted upward or downward along with the subsampling rate.

Figure 4:
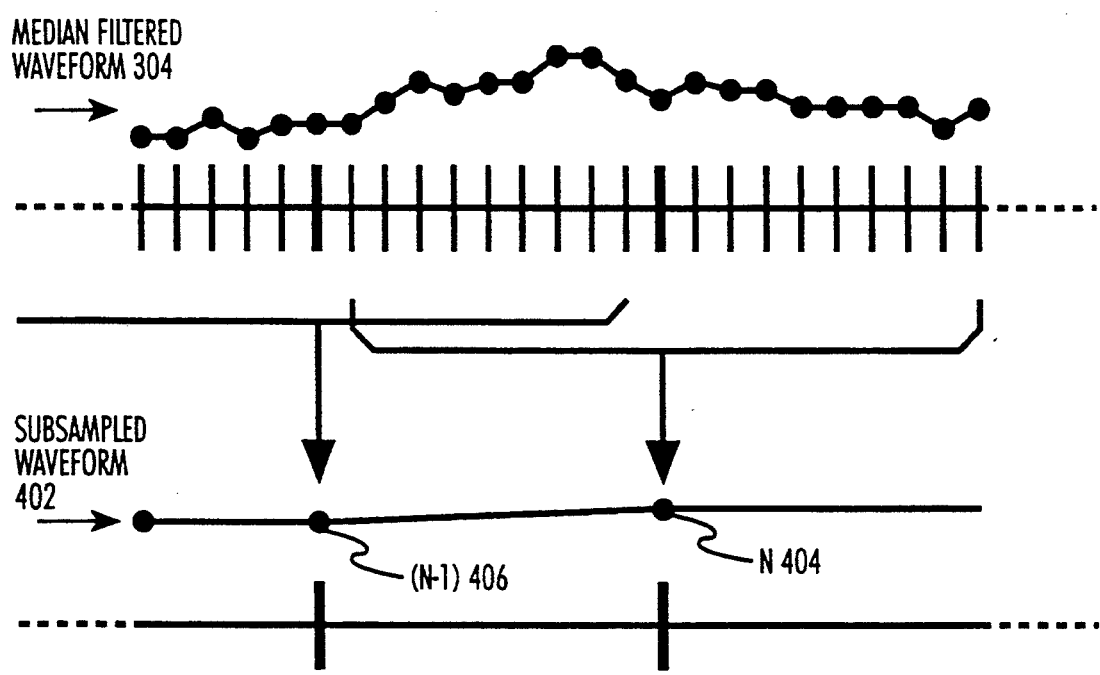
FIG. 4 depicts a graphical representation of a median filtered waveform that is subsampled with a triangular averaging window to produce a subsampled waveform.

For example, FIG. 4 depicts a graphical representation of a median filtered waveform 304 that is subsampled with a triangular averaging window to produce a subsampled waveform 402. Triangular averaging subsampling can be accomplished by making a Point N 404 in the subsampled waveform 402 equal to ((point N−9)×0.1)+((point N−8)×0.2)+((point N−7)×0.3)+((point N−6)×0.4)+((point N−5)×0.5)+((point N−4)×0.6)+((point N−3)×0.7)+((point N−2)×0.8)+((point N−1)×0.9)+((point N×1.0)+((point N+1)×0.9)+((point N+2)×0.8)+((point N+3)×0.7)+((point N+4)×0.6)+((point N+5)×0.5)+((point N+6)×0.4)+((point N+7)×0.3)+((point N+8)×0.2)+((point N+9)×0.1) all divided by 10. In this example, the triangular average window width is 19 and the slope is 1/10. As a result of subsampling, each 720-point filtered waveform is reduced to 72-point subsampled waveform. Thus, five vector subsampled 72-point waveforms 402 are produced. This information is passed to step 206 via dam flow arrow 205. The oil pressure vector waveforms are sent (bypass steps 208 and 210) directly to step 214, which is described below, via data flow arrow 217.

Figure 5:
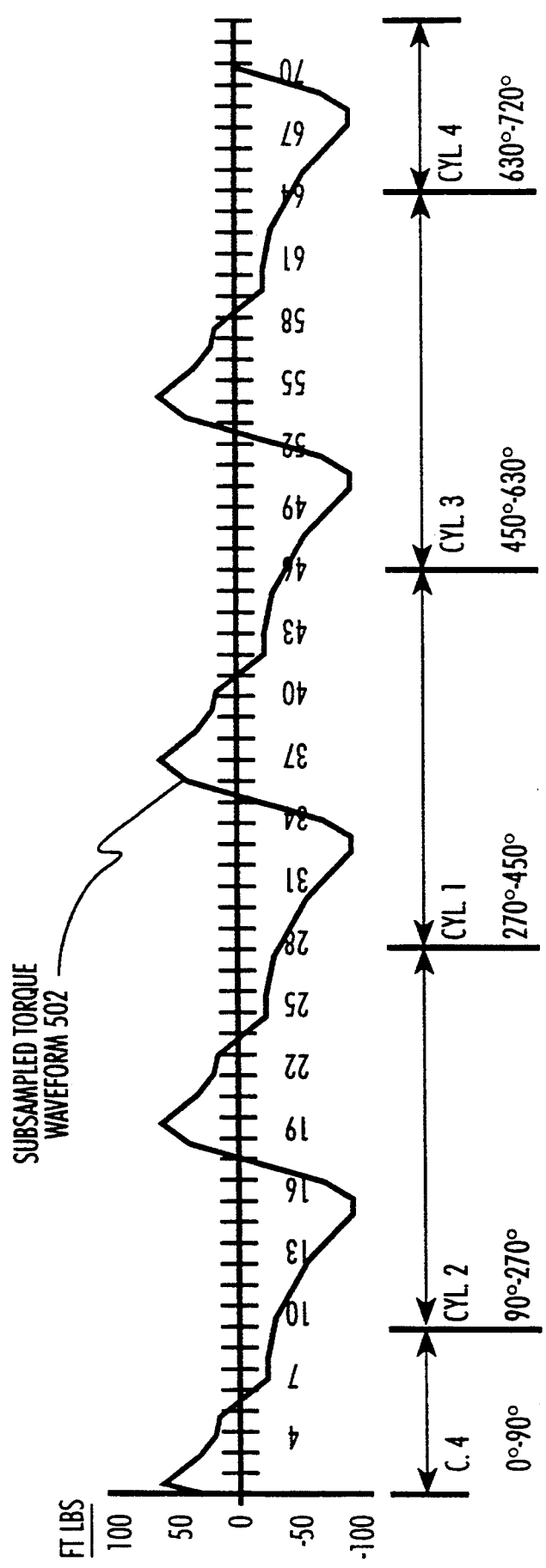
FIG. 5 depicts a graphical representation of how a subsampled torque waveform is partitioned by cylinder.

Next, referring to FIG. 2A, in step 206 the subsampled waveforms 402 representing torque, intake pressure and exhaust pressure are separated into "areas of influence" of a dominant cylinder. Partitioning by cylinder allows a detailed evaluation of each cylinder (distinguish between cylinders) and allows observation of any imbalances among cylinders. For example, as shown in FIG. 5, a subsampled torque waveform 502 is partitioned by cylinder (a 4-cylinder engine having a firing order of 1-3-4-2). One engine cycle (e.g., 720°) is divided into 180° segments approximately corresponding to the 2nd half of a cylinder's compression stroke (negative torque) and the 1st half of a cylinder's power stroke (positive torque). There is no ignition or fuel during cold test, therefore positive torque is generated essentially from "decompression."

For the intake pressure waveform (not shown), the engine cycle is divided into segments corresponding approximately to each cylinder's intake stroke: Cylinder 1: 25°–205°; Cylinder 3: 205°–385°; Cylinder 4: 385°–565°; and Cylinder 2: 565°–720° plus 0°–25°. Other engine degree ranges can alternatively be selected.

For the Exhaust Pressure waveform (not shown), the engine cycle is divided into segments approximately corresponding to each cylinder's exhaust stroke: Cylinder 1: 520°–700°; Cylinder 3: 700°–720° plus 0°–160°; Cylinder 4: 160°–340° and Cylinder 2: 340°–520°. Other engine degree ranges can alternatively be selected. This information is passed to step 208 via data arrow 207. In FIG. 2B, the partitioned subsampled waveform is shown as signal 223 from the triangular averaging window filter 222 and partition 232.

Next, referring to FIG. 2A, in step 208 a "mean" cylinder event (180°) is determined by calculating the point-by-point means of the individual cylinder events (or in other words combining point-by-point data from separate subsampled waveforms). This is accomplished by passing the partitioned subsampled waveform signal 223 from the triangular averaging window filter/partition filter 222,232 through the mean filter 228.

Figure 6:
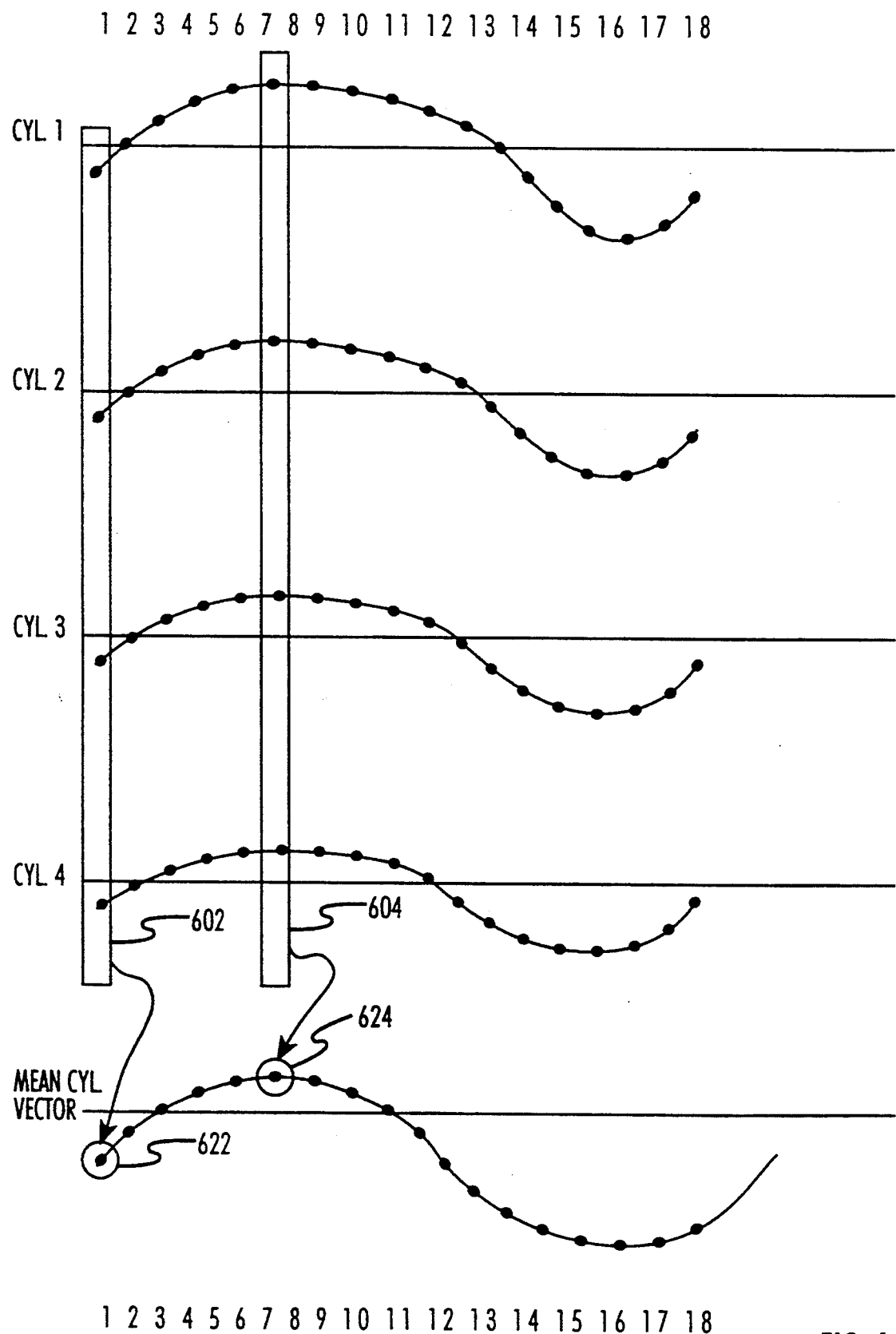
FIG. 6 depicts a graphical representation of four subsampled 18-point vector waveforms representing cylinders 1–4 and an 18-point "mean" vector waveform representing the "mean" of all four cylinder vector waveforms.

FIG. 6 depicts a graphical representation of four subsampled 18-point vector waveforms representing cylinders 1–4 for a cylinder event (180°) and an 18-point "mean" vector waveform representing the "mean" of all four cylinder vector waveforms for the cylinder event (180°). As shown in FIG. 6, the first point 622 of the "mean cylinder" waveform vector is equal to the mean of the four first points 602 located on the individual cylinder waveforms 1–4. Likewise, the seventh point 624 of the "mean cylinder" waveform vector is equal to the mean of all four seventh points 604 located on the individual cylinder waveforms 1–4. Generally, point N of the mean cylinder waveform vector is equal to the mean of the four point Ns of the individual cylinder waveforms. The mean formula is:

$$\mu = \frac{1}{n} \sum_{i=1}^{n} X_i \tag{eq. 1}$$

The "mean" cylinder waveform for each of the crankshaft torque, intake pressure and exhaust pressure waveforms is determined as expressed in equation 1. In step 210, a standard deviation cylinder event is determined by repeating the operational steps of step 208. In this case the standard deviation cylinder event is calculated point-by-point from the individual cylinders. Referring to FIG. 2B, this is accomplished by passing the subsampled partitioned waveform signal 223 through the standard deviation filter 224.

The standard deviation cylinder event is calculated by substituting the "standard deviation" formula for the "mean" formula described in step 208 of FIG. 2A. The standard deviation formula is:

$$\sigma = \frac{1}{n-1} \sum_{i=1}^{n} (X_i - \mu)^2 \qquad \text{(eq. 2)}$$

Applying the separated subsampled waveforms from cylinders 1–4 to the standard deviation formula an 18-point "standard deviation" vector is obtained for one cylinder event from each of crankshaft torque, intake pressure and exhaust pressure waveforms (parameters). A cylinder event is 180°.

Information from steps 202–210 are utilized to perform Principal Component Analysis. As shown in FIG. 2B signals produced from the mean filter 228 and the standard deviation filter 224 (crankshaft torque, intake pressure and exhaust pressure waveforms) are passed to the principle component analysis filter 226 via 225, 229. Additionally, oil pressure waveforms are sent to principal component analysis filter 226 via 263. PCA is performed each time a new engine is tested. The operation of the principle component analysis filter 226 will now be described with reference to FIG. 2A.

Principle component analysis is a well-known statistical processing method used to reduce the dimensionality of a data set while retaining most of the information. For example, an n-point data vector can represent one point in n-dimensional space. Principle component analysis finds a formula that transforms data points from their original space into a new space with the same number of dimensions. In the new space, the first dimension represents the direction of maximum variance in the original data space; the second dimension represents the direction orthogonal to the first which has greatest variance; the third dimension represents the direction orthogonal to the first and second which has greatest variance; and so on. It is cumbersome to maintain engineering units (such as foot-pounds, pressure-per-square-inch, etc.) after principle component analysis is performed. Therefore engineering units are typically ignored after principle component analysis and the resultant data is assumed to be dimensionless. Principle component analysis is generally discussed in I. T., Jolliffe, *Principle Component Analysis,* Springer Verlag, 1986.

With engine data diagnostics, the first several dimensions in the new space generally account collectively for 90–99% of the total variance present in the original data set. Accordingly, the remaining dimensions are ignored so as to obtain a reduced data set.

Principle component analysis is performed in advance on the following sets of data obtained vectors from a group of engines representing typical production: the torque mean cylinder event; the torque standard deviation cylinder event; the intake pressure mean cylinder event; the intake pressure standard deviation cylinder event; the exhaust pressure mean cylinder event; the exhaust pressure standard deviation cylinder event; and the dynamic oil pressure waveform. This results in six 18-dimensional to 18-dimensional transformation formulas and one 72-dimensional to 72-dimensional formula. The general formula can be expressed in the form of a coordinate transformation:

$$y = Ax + c \qquad \text{(eq. 3)}$$

where y is the point in the new space and x is the point in the original space. "A" is a matrix of size 18×18 or 72×72, and c is a vector of constants. In expanded form, the formula would appear as follows (3×3 case):

$$\begin{bmatrix} Y_1 \\ Y_2 \\ Y_3 \end{bmatrix} = \begin{bmatrix} A_{11} A_{12} A_{13} \\ A_{21} A_{22} A_{23} \\ A_{31} A_{32} A_{33} \end{bmatrix} \begin{bmatrix} X_1 \\ X_2 \\ X_3 \end{bmatrix} + \begin{bmatrix} C_1 \\ C_2 \\ C_3 \end{bmatrix} \qquad \text{(eq. 4)}$$

Exact formulas in size, content and quantity are application dependent, but can be generated by those skilled in the art. Using the formulas derived above (e.g., eq. 3 and 4), the data is converted from original space to new space in step 214. The vector elements in the new space are called "Principal Component Values" (PCs). Conversion is performed as follows:

Apply the torque mean cylinder event transformation to the each of the individual cylinder events of the torque waveform to produce four sets of individual cylinder torque PCs (one set of principle components per cylinder).

Apply the torque mean cylinder event transformation to the mean cylinder event of the torque waveform to produce torque mean cylinder event PCs.

Apply the torque-standard-deviation-cylinder-event transformation to the standard deviation cylinder event of the torque waveform to produce torque standard deviation cylinder event PCs (one set of principle components per cylinder).

Apply the intake-pressure-mean-cylinder-event transformation to each of the individual cylinder events of the intake pressure waveform to produce four sets of individual cylinder intake pressure PCs.

Apply the intake-pressure-mean-cylinder-event transformation to the mean cylinder event of the intake pressure waveform to produce intake pressure mean cylinder event PCs.

Apply the intake-pressure-standard-deviation-cylinder-event transformation to the standard deviation cylinder event of the intake pressure waveform to produce intake pressure standard deviation cylinder event PCs.

Apply the exhaust-step-pressure-mean-cylinder-event transformation to each of the individual cylinder events of the exhaust pressure waveform to produce four sets of individual cylinder exhaust pressure PCs (one set of principle components per cylinder).

Apply the exhaust-pressure-mean-cylinder-event transformation to the mean cylinder event of the exhaust pressure waveform to produce exhaust pressure mean cylinder event PCs.

Apply the exhaust-pressure-standard-deviation-cylinder-event transformation to the standard deviation cylinder event of the exhaust pressure waveform to produce exhaust pressure standard deviation cylinder event PCs.

Apply the dynamic-oil-pressure-waveform transformation to the dynamic-oil-pressure-waveform to produce oil pressure PCs.

Compute the average value of the static oil pressure waveform to produce a synthetic static oil pressure PC.

Once the data is converted to PCs, it is sent to step 216 via data flow arrow 215.

In step 216, only the most significant PCs are retained in memory (not shown), because the most important information (in the form of variance) is contained in the first several PCs of a vector. Therefore, only the most significant PCs are needed for further processing. In the preferred embodiment the most significant PCs are retained as follows:

The first two PCs of the torque waveform's first individual cylinder event:

The first two PCs of the torque waveform's second individual cylinder event;

The first two PCs of the torque waveform's third individual cylinder event;

The first two PCs of the torque waveform's fourth individual cylinder event;

The first four PCs of the torque waveform's mean cylinder event;

The first five PCs of the torque waveform's standard deviation cylinder event;

The first two PCs of the exhaust pressure waveform's first individual cylinder event;

The first two PCs of the exhaust pressure waveform's second individual cylinder event;

The first two PCs of the exhaust pressure waveform's third individual cylinder event;

The first two PCs of the exhaust pressure waveform's fourth individual cylinder event;

The first tour PCs of the exhaust pressure waveform's mean cylinder event;

The first two PCs of the exhaust pressure waveform's standard deviation cylinder event;

The first two PCs of the intake pressure waveform's first individual cylinder event;

The first two PCs of the intake pressure waveform's second individual cylinder event;

The first two PCs of the intake pressure waveform's third individual cylinder event;

The first two PCs of the intake pressure waveform's fourth individual cylinder event;

The first three PCs of the intake pressure waveform's mean cylinder event:

The first four PCs of the intake pressure waveform's standard deviation cylinder event;

The first six PCs of the dynamic oil pressure waveform; and

The static oil pressure PC.

The above PCs are combined into a vector called the PC vector. In the preferred embodiment the PC vector has 53 PCs, which are saved in memory. Although the above selection of retaining PCs is employed in the preferred embodiment, other variations of PC retention can easily be employed depending on various engineering considerations such as balance of information among signals, the amount of desired accuracy versus processing requirements and so forth.

After the completion of step 216, preprocessing of cold test measurements is complete.

1.3 Classify Engine

Figure 7:
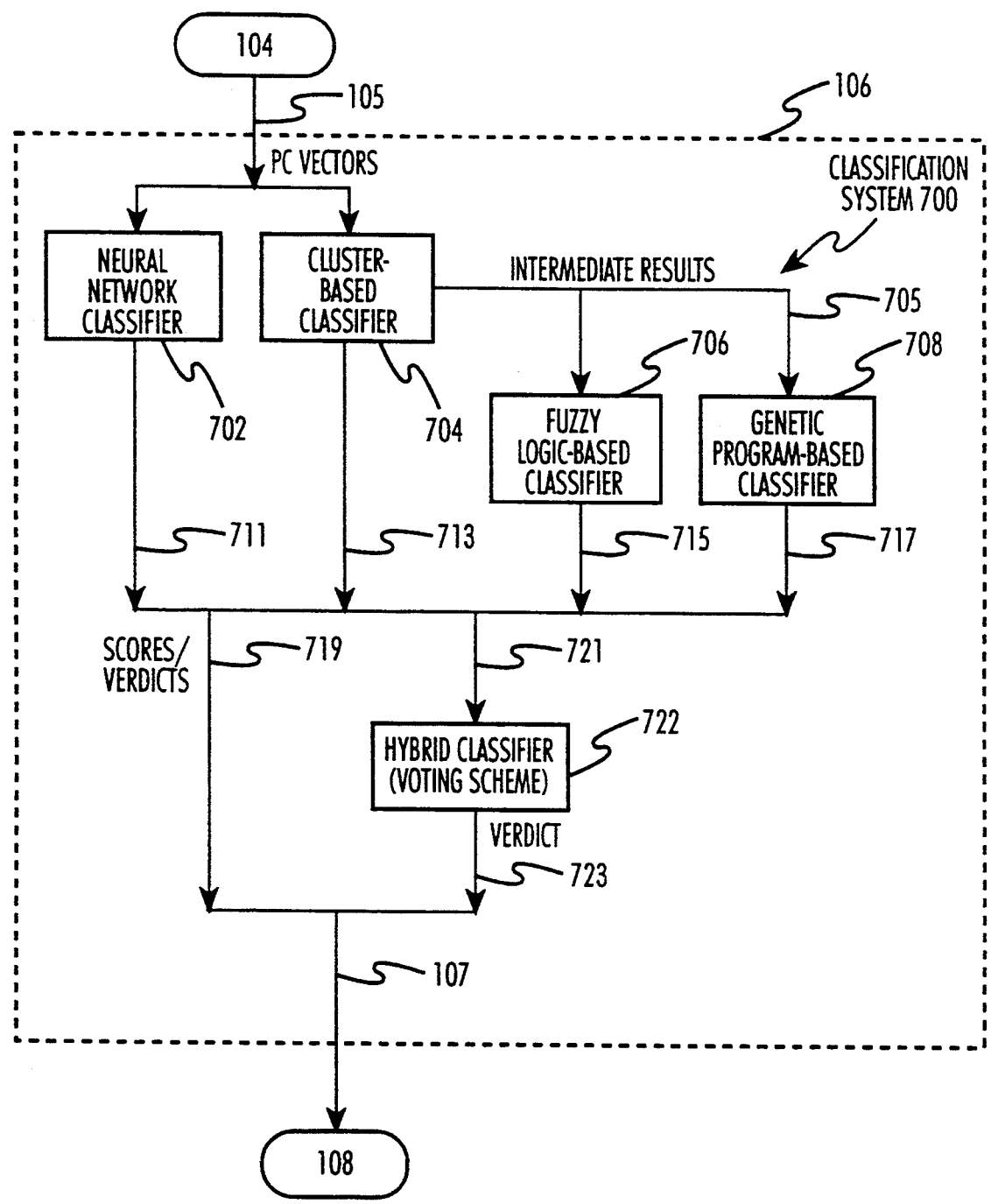
FIG. 7 is a block diagram of an engine classifier system that is used to classify an engine in accordance with step 106 of FIG. 1.

After measurements have been preprocessed in step 104 of FIG. 1, the PC vector is passed to step 106, via data flow arrow 105, to classify the engine 101. FIG. 7 is a block diagram of an engine classifier system 700 that is used to classify engine 101 in accordance with step 106 of FIG. 1. Referring to FIG. 7, engine classifier system 700 includes a plurality of classifiers: a neural network classifier 702, a cluster based classifier 704, a fuzzy logic based classifier 706, and a genetic program-based classifier 708. Results from one, several or all of the classifiers 702, 704, 706, and 708 can be used to obtain a verdict about the engine 101.

A hybrid classifier 722 employs a voting scheme which selects scores/verdicts 711,713, 715 717 pro- duced from classifiers 702,704, 706, and 708 to arrive at a verdict 723.

It should be noted that arrows 711,713,715,717 719, 721,723, 107 between classifiers 702, 704, 706, 708, 722 represent data flow in the form of digital signals (in the case of a computer implemented process between subroutines in software as performed in the preferred embodiment), busses (in the case of a hardware based system) or a combination of busses and digital signals in the case of hybrid system. In the preferred embodiment, the engine classifier system 700 is a computer implemented process that has the capability to read and write information to a memory unit (not shown). The functionality of each classifier is described in more detail below.

A. Neural Network Classifier

PC vectors enter the neural network classifier 702 via data flow arrow 105. A neural network is an organized arrangement of processing elements which operate in a parallel fashion to solve a particular task. For more information the reader may refer to texts written on the subject of neural networks and parallel processing such as: *Explorations in Parallel Distributed Processing: A Handbook in Model Programs and Exercises,* McClelland and Rumelhart, Volumes 1 & 2, The MIT Press, Cambridge, Mass. 1988.

In the preferred embodiment a Back-propagation neural network paradigm is used. This paradigm is very popular and is easily implemented by those skilled in the relevant art. Specifically, a three-layer back-propagation network is used, with 53 nodes in the input layer (one per PC vector element), 12 nodes in the hidden layer and two nodes in the output layer (one per output class-pass or fail). Bias nodes are used in the input and hidden layers. A sigmoidal transfer function is used in the hidden and output nodes.

The neural network classifier 702 in the preferred embodiment is trained in advance for fault detection by using PC vectors from engines with known pass/fail statuses. Each output node of the neural network classifier 702 produces a scalar value output between 0 and 1. The output values can be interpreted in a number of ways. One interpretation method is to use the higher valued of the two output nodes (known as the winning node) to indicate the pass/fail status of the engine.

Another interpretation method is known as the threshold method. In this method either the pass node or the fail node can be compared to a threshold (between 0 and 1) stored in memory to determine a verdict. An operator chooses which node to utilize for comparison to the threshold and which node to ignore. The operator also has the ability to select, through a computer interface (e.g., a keyboard, not shown), the particular threshold value to use. For example, the operator may select the pass node and a given threshold of 0.3. Thus, if the pass node value exceeds the given threshold, then the engine passes. Otherwise, the engine 101 fails. In the preferred embodiment, the operator is given the option to choose among the interpretation methods and to chose the threshold.

The neural network classifier 702 may be implemented in hardware, firmware or as a computer process performed by a computer (as in the preferred embodiment).

B. Cluster-Based Classifier

The cluster-based classifier is a "spherical" measuring system in which attributes (e.g., PCs of torque, PCs of intake pressure, etc.) of model (i.e., "good") engines are calculated and saved in memory (not shown) in advance. The general concept is that a multi-dimension plot (having an origin derived from the average statistics of a group of good engines) provides a basis to plot measured engine attributes and compare these measured attributes to the origin. Once the attribute of an engine under test is plotted, its distance from the origin will be determined. The magnitude of the distance provides a basis for declaring an attribute of an engine normal or faulty. Good engines will tend to cluster around the origin. Whereas engines that tend to cluster away from the origin of the plot are typically faulty.

Figure 8:
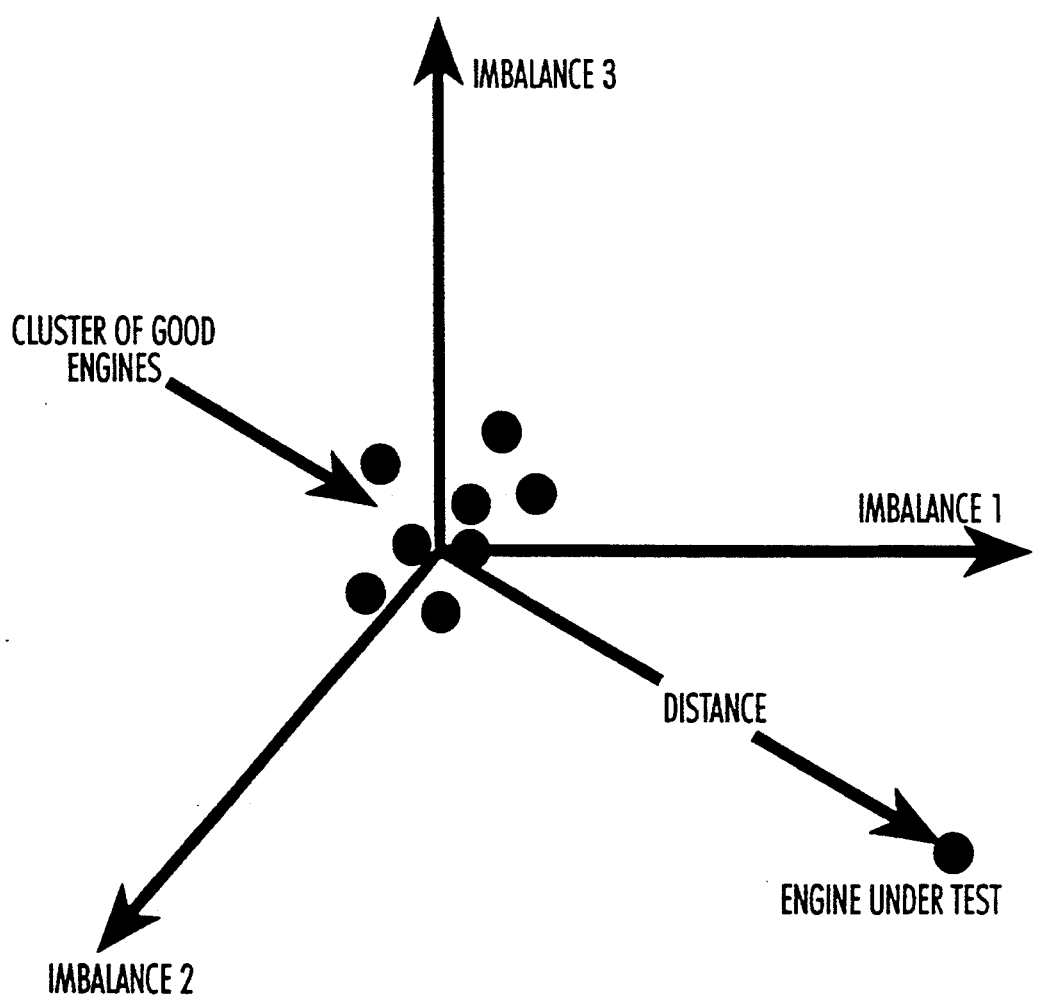
FIG. 8 is a plot showing the conceptual basis for a cluster-based classifier system.

FIG. 8 is a plot showing the conceptual basis for a cluster-based classifier system. The center or origin of the plot provides the basis for calculating distances. The concept behind the cluster-based classifier is to use test parameters of an engine to determine its "distance" from the center of a cluster of nominally good engines. The cluster of good engines are programmed into the classifier 704 in advance and saved in memory (not shown). Origin of the plot is the center of the cluster of good engines. The axes of the plots do not correspond to physical dimensions/measurements. The units are in standard deviations of the principle components of the engines.

The cluster-based classifier operates as follows. Each element of a PC vector signal 105 is first normalized by subtracting the mean (calculated in advance) of the corresponding elements of the PC vectors derived from representative group of normal engines, and then dividing by the standard deviation (calculated in advance) of those same elements. The mean is calculated in advance using the following formula:

$$\mu = \frac{1}{n} \sum_{i=1}^{n} X_i \qquad \text{(eq. 5)}$$

where: "n" is the number of good engines, "x" is the particular PC, and "i" is the index into the list of good engines (e.g., if there are 100 good engines then i=1 to 100). The mean formula is applied to each element in the PC vector 105 (i.e., a mean PC is taken for each of the 53 PCs of the PC vector 105 to yield 53 "means" and likewise 53 "standard deviations" below). The standard deviations are calculated in advance using the following formula:

$$J = \frac{1}{n-1} \sum_{i=1}^{n} (X_i - \mu)^2 \qquad \text{(eq. 6)}$$

In the preferred embodiment, the normalized PC vector is then divided into 13 groups of related PCs. Some PCs appear in more than one group. For different engines there may be different groups with different memberships. Each group represents the PCs from a particular measurement or partition of the engine. In the preferred embodiment, the groups are constructed as follows:

Group 1: Cylinder 1
The first 2 PCs of the torque waveform's first individual cylinder event;
The first 2 PCs of the exhaust pressure waveform's first individual cylinder event; and
The first 2 PCs of the intake pressure waveform's first individual cylinder event.
Group 2: Cylinder 2
The first 2 PCs of the torque waveform's second individual cylinder event;
The first 2 PCs of the exhaust pressure waveform's second individual cylinder event; and
The first 2 PCs of the intake pressure waveform's second individual cylinder event.
Group 3: Cylinder 3
The first 2 PCs of the torque waveform's third individual cylinder event;
The first 2 PCs of the exhaust pressure waveform's third individual cylinder event; and
The first 2 PCs of the intake pressure waveform's third individual cylinder event.
Group 4: Cylinder 4
The first 2 PCs of the torque waveform's fourth individual cylinder event:
The first 2 PCs of the exhaust pressure waveform's fourth individual cylinder event; and
The first 2 PCs of the intake pressure waveform's fourth individual cylinder event.
Group 5: Torque
The first 4 PCs of the torque waveform's mean cylinder event.
Group 6: Torque Variation
The first 5 PCs of the torque waveform's standard deviation cylinder event.
Group 7: Exhaust Pressure
The first 4 PCs of the exhaust pressure waveform's mean cylinder event.
Group 8: Exhaust Pressure Variation
The first 2 PCs of the exhaust pressure waveform's standard deviation cylinder event.
Group 9: Intake Pressure
The first 3 PCs of the intake pressure waveform's mean cylinder event.
Group 10: Intake Pressure Variation
The first 4 PCs of the intake pressure waveform's standard deviation cylinder event.
Group 11: Imbalance
The first PC of the torque waveform's standard deviation cylinder event;
The first PC of the exhaust pressure waveform's standard deviation cylinder event; and
The first PC of the intake pressure waveform's standard deviation cylinder event.
Group 12: Dynamic Oil Pressure
The first 6 PCs of the dynamic oil pressure waveform.
Group 13: Static Oil Pressure
The static oil pressure PC.

A "distance-from-center" parameter is calculated for each group of the engine's PCs by calculating the square root of the sum of the group's elements squared. These distance parameters are regarded as the engine's Euclidean distances from the center of the clusters of the "good" engines as conceptually shown in FIG. 8.

Engines are rated via a rating function (described in more detail below) according to these distance parameters. Low-valued distance parameters are favorable, because they reflect a high degree of similarity to the "good" engines. Whereas higher-valued distance parameters are unfavorable.

Figure 9:
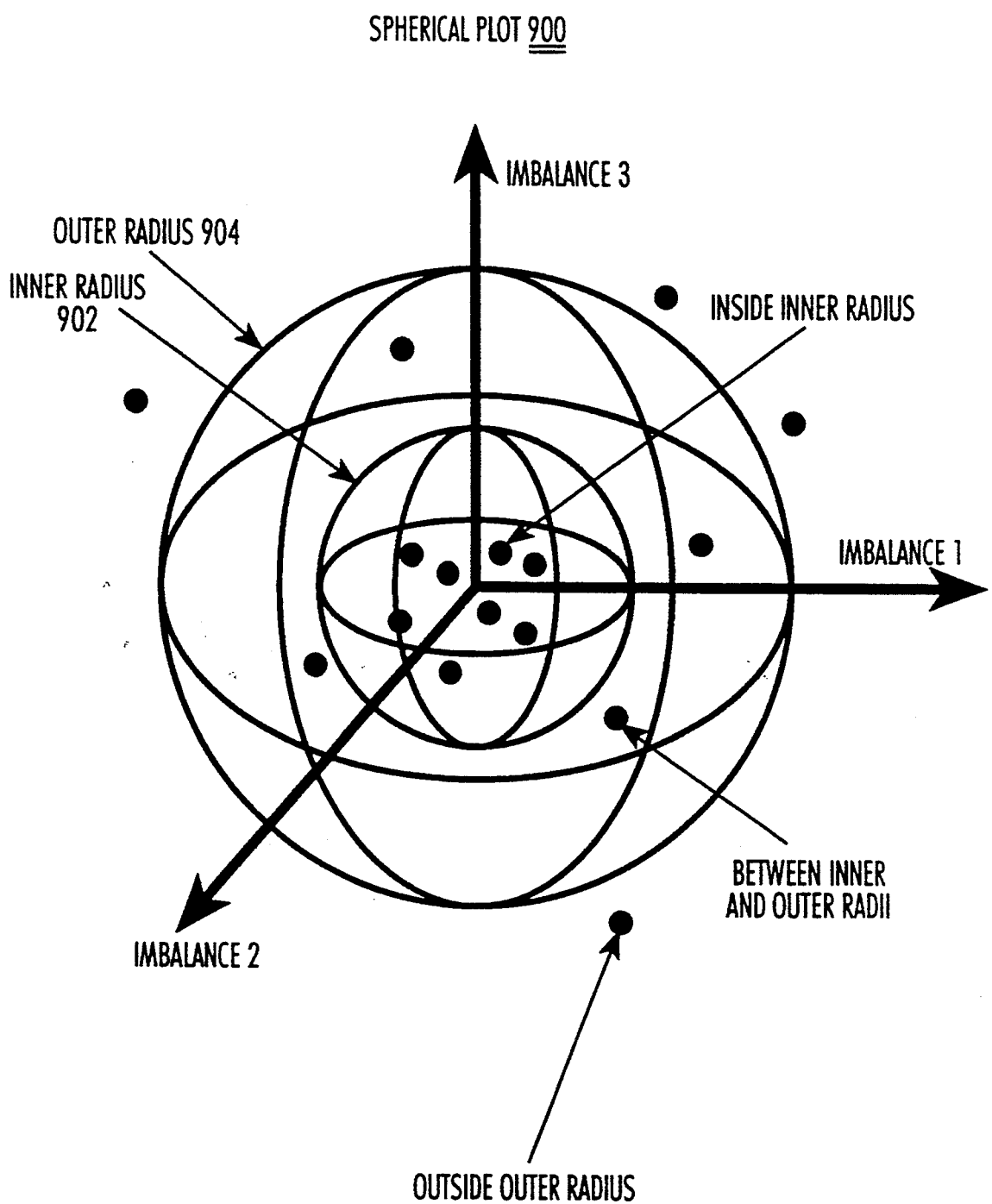
FIG. 9 depicts a 3-dimensional example spherical plot having an inner radius and an outer radius centered around a cluster of nominally good engines for the cluster-based classifier.

Referring to FIG. 9, with two radii 902,904 in the 3-dimensional plot centered around a cluster of nominally good engines, it is possible to mathematically score an engine under test. For example, if an engine's PC plot is inside the inner radius 902 (i.e., the engine's distance from the origin is less than the inner radius 902), then the engine is considered similar to good engines and receives a score of 1. If the engine's distance from the origin is greater than the outer radius 904, then the engine under test is considered to be dissimilar to good engines and receives a score of zero. If the engine's PC plot is somewhere between the inner and outer radii 902,904, then the engine under test receives a score between 0 and 1. corresponding to its proximity to the inner radius 902.

Figure 10:
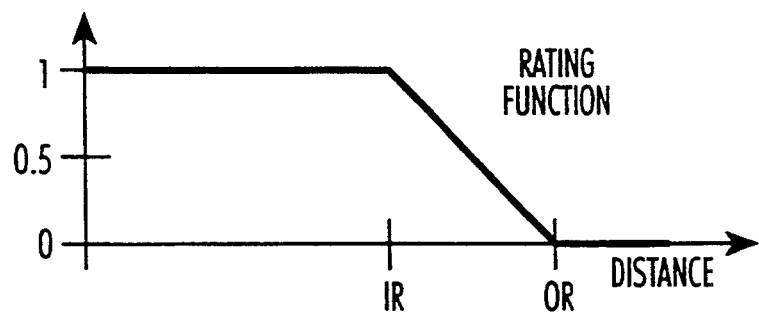
FIG. 10 depicts a graphical representation of a piecewise-linear shape rating function.

Mathematically, the rating function can be expressed as follows:

$$1: d \leq IR \quad \text{(eq. 7)}$$
$$f(d) = \frac{(OR - d)}{(OR - IR)} : IR < d < OR$$
$$0: d \geq OR$$

where: IR is the inner radius 902 and OR is the outer radius 904. The rating function is shown graphically in FIG. 10. As shown in FIG. 10, the rating function is piece-wise-linear in shape, which is one of many types of rating functions that can be used. The only constraint for the rating function is that it be monotonically non-increasing with increasing distance starting at 1 and ending at 0.

A rating function that meets these constraints would give a high rating for a small distance and a low rating for a large distance. The rating function applied to a distance parameter comprises a "test" whose score is simply the output of the rating function. Since there is one test associated with each distance parameter, there is a total of 13 individual tests for a 4-cylinder engine in the preferred embodiment. A different body of tests could be applied. FIG. 9 demonstrates a 3-dimensional example spherical plot 900 having an inner radius 902 and an outer radius 904 centered around cluster of nominally good engines. Each dot/point on the plot 900 represents one engine.

There are 13 different spherical tests in the preferred embodiment, each with a score between 0 and 1. These test correspond to its 13 distance parameters derived from the 13 groups of related PCs. The scores from the tests can be combined in a number of ways to produce a final score. One possible way is to sum the scores to produce a "total score." Another method of combination is to determine an engine's lowest individual test score. This is called the "minimum score."

In the preferred embodiment, both the minimum and total score are considered. If the minimum score is greater than zero and the total score exceeds an adjustable threshold, then the engine passes. Otherwise, the engine fails. The threshold is adjustable according to the engine being tested and the test requirements.

Referring to FIG. 7, once a test score (signal) is obtained from cluster-based classifier 704, it can be sent as an intermediate result and transferred to the genetic program-based classifier 708 via data path 705. Once a distance parameter is obtained from classifier 704, it can be sent as an intermediate result to the fuzzy logic-based classifier 706. It is also possible to utilize the test score (signal) for voting in the hybrid classifier 722 via paths 713,721 or to utilize the test score as a verdict.

C. Fuzzy-Logic Based Classifier

Fuzzy logic classifier 706 receives intermediate results from the cluster-based classifier 704 via path 705. Thus, the fuzzy logic classifier 706 receives 13 "distance" parameters which were calculated by the cluster-based classifier 704. These 13 parameters were discussed in detail in the cluster-based classifier section above. Fuzzy logic is known by those skilled in the relevant art and is discussed in Zadeh, L. A., *Fuzzy, sets, Information and Control*, Vol. 8, pp. 338–353, 1965.

There are three fuzzy logic rules for classifier 706. They are as follows:

1) If the distance is <u>small</u>, the engine is <u>normal</u>;
2) If the distance is <u>medium</u>, the engine is <u>marginally normal</u>; and
3) If the distance is <u>large</u>, the engine is not <u>normal</u>.

Figure 11:
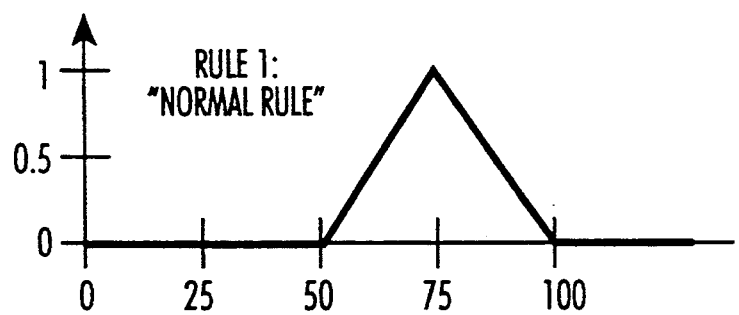
FIG. 11 depicts a graphical representation of the "normal" rule.
Figure 12:
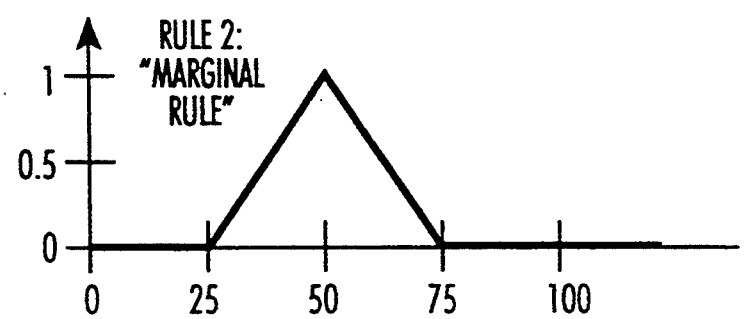
FIG. 12 depicts a graphical representation of the "marginal" rule.
Figure 13:
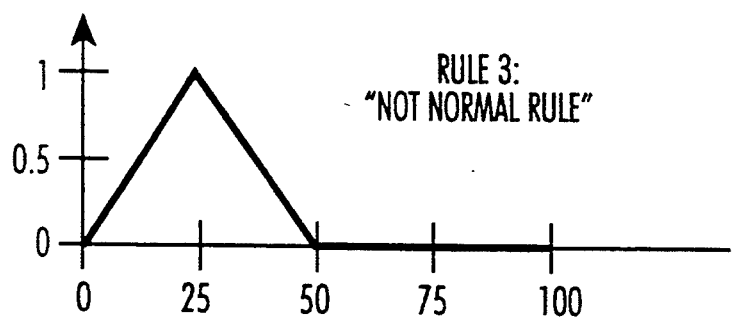
FIG. 13 depicts a graphical representation of the "not normal" rule.

The underlined terms above are the names of fuzzy sets. The distance parameters belong, in varying degrees, to the sets <u>small</u>, <u>medium</u> and <u>large</u>. FIGS. 11, 12 and 13 graphically express rules 1, 2 and 3, respectively. In the X-axis of FIGS. 11–13 a scale value of 100 was used. However, any desired resolution of scale can be employed, as long as the resolution selected (scale along the X-axis) is consistent for all the rules and is sufficiently dense to allow differentiation among engines in different classes. Upon application of the fuzzy rules, the engine belongs in some degree to the set <u>normal</u>. The classification mechanism compares an engine's degree of membership in the set <u>normal</u> to an adjustable threshold to determine whether the engine passes or fails. The threshold is stored in memory (not shown) of the system 700. The threshold may be adjusted by the operator of the system.

Figure 14:
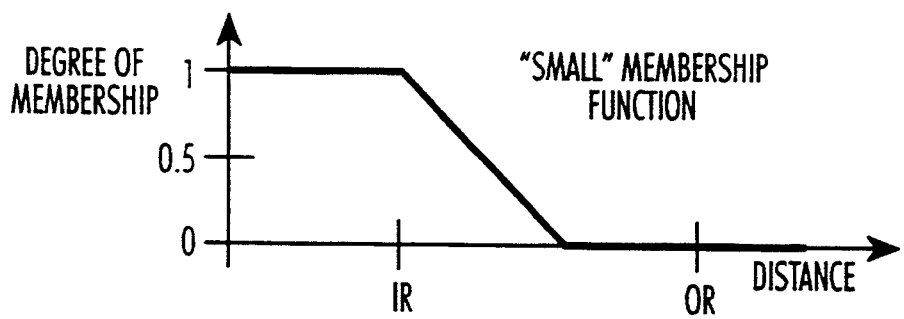
FIG. 14 is a representative graph illustrating a function for determining the degree of membership in the set "small."
Figure 15:
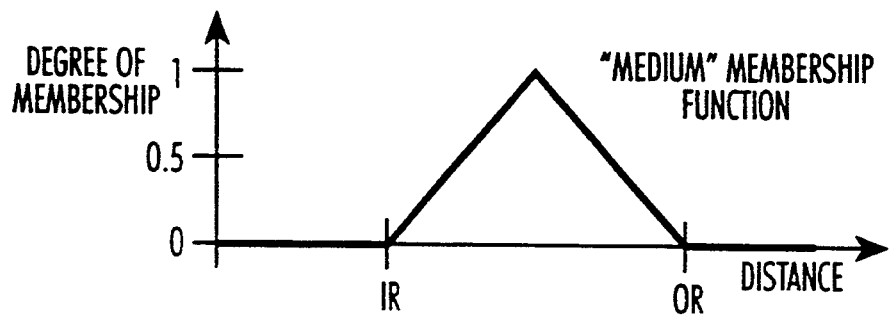
FIG. 15 is a representative graph illustrating a function for determining the degree of membership in the set "medium."
Figure 16:
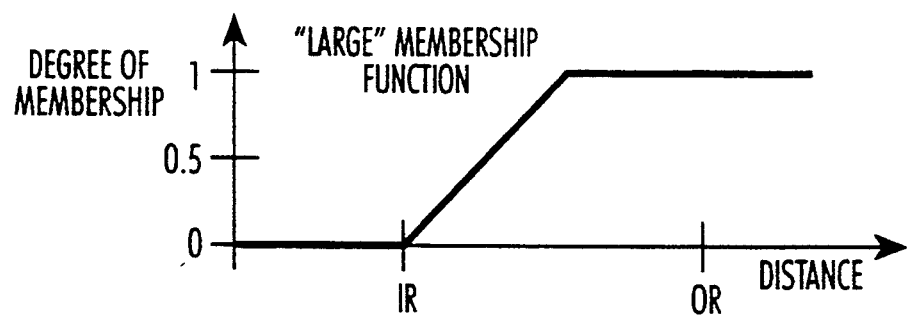
FIG. 16 is a representative graph illustrating a function for determining the degree of membership in the set "large."

Each of the 13 distance parameters is passed through the three membership functions to assess its membership in the sets <u>small</u>, <u>medium</u> and <u>large</u>. The degrees of membership vary between 0 and 1 according the membership functions shown in FIGS. 14, 15 and 16. For mathematical convenience, the scale along the Y-axis is 0-to-1 for FIGS. 14–16. The IR and OR are indications of Inner Radius and Outer Radius discussed above and shown in FIG. 9.

The fuzzy rules are implemented by conducting the fuzzy AND operation (multiplication). That is, for a given distance parameter, rule 1 is scaled by the degree of membership in <u>small</u> set, rule 2 is scaled by the degree of membership in the <u>medium</u> set, and rule 3 is scaled by the degree of membership in the <u>large</u> set. These operations are conducted for each of the 13 distance parameters for a total of 39 scaled rules.

Figure 17:
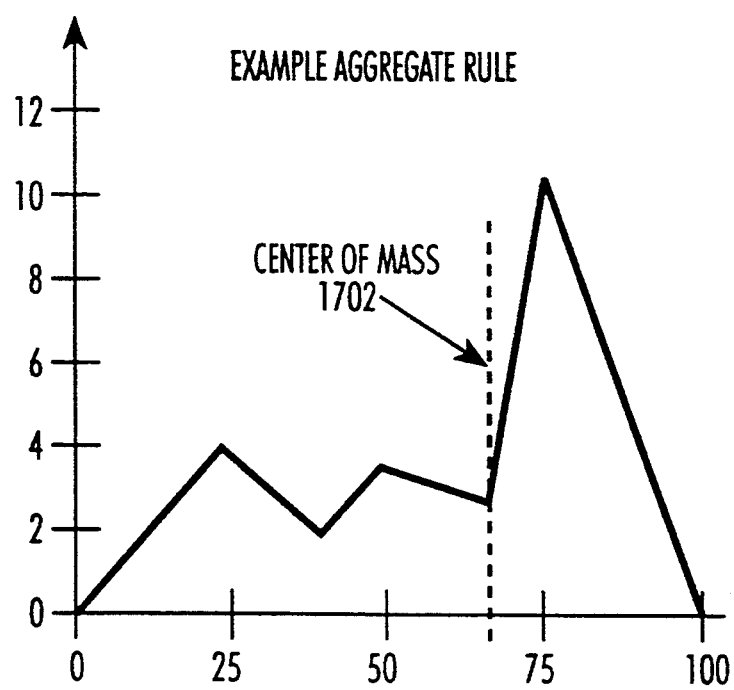
FIG. 17 depicts an example of the aggregate rule.

The resulting scaled rules are added vertically (Y-axis) to form an "aggregate" rule. An example aggregate rule is shown in FIG. 17. FIG. 17 is an accumulation of each of the 39 scaled rules added along the Y-axis.

Next, the fuzzy logic-based classifier 706 assesses the engine's degree of membership in the normal set by "defuzzifying" the aggregate rule. This is accomplished by calculating the "Center of Mass" 1702 of the aggregate rule, which is the horizontal point at which half the area under the graph extends to the left and half extends to the right. The Center of Mass 1702 is determined by integrating the total area of the graph shown in FIG. 17 and then determining the accumulated integral from left-to-right until the accumulated integral equals ½ the total integrated area of the graph.

According to the graphical rules FIGS. 11–13 an aggregate rule graph FIG. 17, with more area to the "right" of FIG. 17, will correspond to an engine 101 which is "normal" (i.e., the individual tests tended to contribute more of the "normal rule" shown in FIG. 11) and in this situation the Center of Mass 1702 will appear more to the right of the graph in FIG. 17. Conversely, an aggregate rule with more area to the left of the graph in FIG. 17 will correspond to an abnormal engine 101 (i.e., the individual tests tended to contribute more of the "Not Normal" rule shown in FIG. 13). This will cause the Center of Mass 1702 to be shifted more to left of the center position of the graph shown in FIG. 17.

Figure 18:
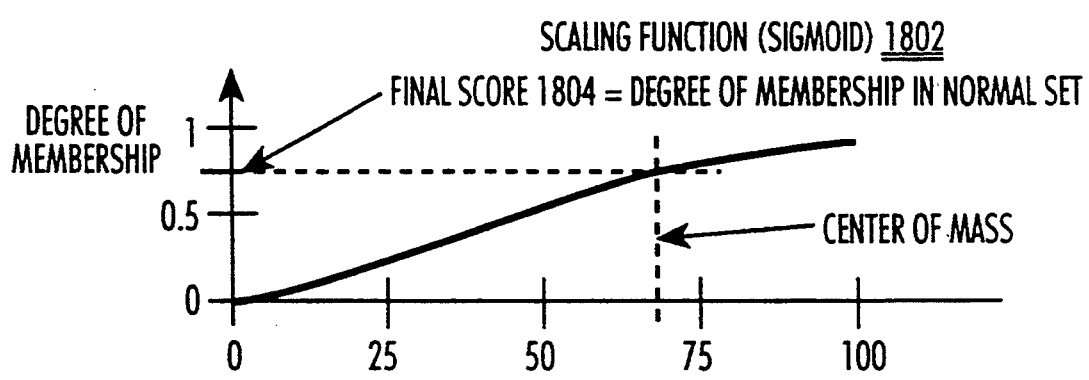
FIG. 18 is graphical representation of a sigmoidal scaling function.

In order to interpret the graph of the aggregate rule shown in FIG. 17, the Center of Mass 1702 is passed through the scaling function 1802 shown in the graph of FIG. 18. Once passed through, a final score 1804 is obtained, which is the degree of membership in the normal set. A higher scaling function score indicates that the Center of Mass 1702 is centered more to the right of aggregate rule graph shown in FIG. 17, corresponding to a normal tested engine. Conversely, a lower scaling function score indicates the Center of Mass 1702 is to left of the center (e.g., 50) of the aggregate rule graph, corresponding to an abnormal engine (i.e., a low degree of membership in the set "normal"). Scores are obtained by utilizing the scaling function shown in FIG. 18.

FIG. 18 has the same horizontal scale as the rules mentioned above (e.g., 0-to-100). Interpolating the graph in FIG. 18, will provide the degree of membership in the normal set.

There are many different scaling functions which can be employed; however, the graph should be monotonically increasing from approximately zero to approximately one over the width of the graph. In the preferred embodiment, a sigmoidal scaling function is employed which is expressed as $$f(x) = \frac{1}{1 + \exp(-a(x - 50))} \quad \text{(eq. 8)}$$

where: a is a constant (e.g., 0.1) and x corresponds to the resolution along the X-axis. This gives a sigmoid which is approximately equal to 0 at x=0, approximately equal to 1 at x=100, and equal to 0.5 at x=50. The slope at x=50 is 0.1/4=0.025. A pass/fail verdict is made by thresholding this degree of membership. If the degree of membership is greater or equal to a given a given threshold, the engine passes otherwise the engine is faulty. The preferred threshold is 0.5. The threshold is also adjustable by the operator in the preferred embodiment. The threshold is stored in memory (not shown).

D. Genetic Program-Based Classifier

A method of producing functions suited for a particular purpose is called Genetic Programming. Genetic Programming optimizes a population of initially arbitrary functions via techniques derived from principles of biological evolution for the solution of a particular problem. For a discussion in genetic programming see, e.g., John R. Koza, *Genetic Programming: On the Programming of Computers by Means of Natural Selections*, The MIT Press, Mass. 1992.

The purpose of the genetic program-based classifier 708 is to correctly classify engines as "normal" or "faulty" using formulas (and techniques) derived in advance as discussed above. The genetic program-based classifier 708 receives intermediate results 705 from the cluster based classifier 704, described above. In the preferred embodiment, classifier 708 is programmed by the following formula:

$$Genetic\ Score = S2*Prod*(0.012739 - Ave)*1.0 \times 10^8$$

where: S2=Score for spherical test #2 (the Cylinder #2 test); Prod=The product of 13 spherical test scores; and Ave=The average of the 13 spherical test scores (where spherical test scores refer to intermediate results received from the cluster-based classifier 704). The genetic score is compared to a threshold stored in memory (not shown) to arrive at a verdict score. This is output from classifier 708 via 717.

In the preferred embodiment, a threshold of 1.44 was found to be optimal. Engines with a Genetic score above this threshold were called "normal" and engines below this threshold were called "faulty." Additionally, in the preferred embodiment the threshold is adjustable.

E. Hybrid Classifier

The hybrid classifier 722 receives results from the neural network classifier 702 and the cluster-based classifier 704. The fuzzy logic-based classifier 706 and the genetic program-based classifier 708 could also be used to provide input signals to the hybrid classifier 722. However, in the preferred embodiment only classifiers 702 and 704 provide dam to the hybrid classifier 722.

Although each classifier 702 and 704 has its strengths and weaknesses, the hybrid classifier 722 provides a way to maximize fault detection accuracy by making best use of the collective accuracy of the classifiers 702 and 704. The hybrid classifier 722 employs a voting scheme to chose among results of the classifiers 702 and 704. In the preferred embodiment, the greatest accuracy is obtained by the following voting scheme: IF the neural network classifier 702 and the cluster-based classifier 704 indicate normal, THEN the engine under test is "normal" ELSE the engine is "Faulty." If an engine is faulty hybrid classifier 722 will produce a verdict signal, via 723, with a value (e.g., 0) that indicates to an operator that the engine 101 is faulty. If an engine is normal, hybrid classifier 722 will produce a verdict signal, via 723, with a value (e.g., 1) that indicates to an operator that the engine 101 is normal.

1.4 Arrive at Verdict

A key element of the classification strategy is to allow the operator to make the final decision in engine classification. To this end classification system 700 makes available all scores/verdicts via 719 of all the classifiers 702, 704, 706 and 708. Specifically, through path 719 the operator may obtain neural network classifier 702 output node values and a verdict, cluster-based classifier scores/verdict, fuzzy-logic based classifier 706 scores/verdict and genetic program-based classifier 708 scores/verdict. Through the hybrid classifier 722 the operator can receive a combinational vote of a plurality of the classifiers via path 723. Also, in another possible embodiment, the operator can access the PC vector elements values and all intermediate results shown from path 705 if desired.

Referring to FIG. 1, in step 108 the operator arrives at a verdict from the various classifiers 702,704,706, 708 and 722. To customize the process 100, the operator can set the various thresholds (e.g. the network classifier 702, the inner and outer radii of the custom-based classifier 704, etc.) mentioned above so the process can be easily adapted to function with a wide variety of engine designs and parameters.

All the steps done in advance including principle component analysis, neural network training, spherical classification mean and standard deviation, and genetic program formula derivation are performed on a group of engines representative of normal production and they have known pass fail statuses. In order to adapt to changes in design test conditions (or whatever reason) the classification system 700 can be adapted by performing these steps on a different set of engines.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A method for cold testing an internal combustion engine comprising the steps of:
   cranking the engine at a predetermined speed for a predetermined number of revolutions;
   monitoring an operational parameter of the engine during said predetermined number of revolutions;
   producing an electrical signal representing said operational parameter;
   preprocessing said electrical signal to produce a principle component value vector signal representing said operational parameter; and
   analyzing said principle component value vector signal to produce a classification signal indicating, based on the operational parameter, whether the engine is normal or faulty.

2. The method of claim 1, wherein said operational parameter is crankshaft torque in the engine.

3. The method of claim 1, wherein said operational parameter is intake pressure in the engine.

4. The method of claim 1, wherein said operational parameter is exhaust pressure in the engine.

5. The method of claim 1, wherein said operational parameter is oil pressure in the engine.

6. The method of claim 1, wherein said step of preprocessing comprises:
   passing the electrical signal through a median filter to produce a median filter vector signal having a plurality of vector points;
   passing the median filter vector through an averaging filter to produce a subsampled signal;
   partitioning the subsampled signal into segments corresponding to each cylinder event of an engine cycle to produce N subsampled signals, wherein N is the number of cylinders;
   passing each of the N subsampled signals through a mean filter to produce a mean cylinder signal equal to a mean of the N subsampled signals;
   passing each of the N subsampled signals through a standard deviation filter to produce a standard deviation vector signal equal to the standard deviation of the N subsampled signals; and
   passing the standard deviation vector signal and the mean cylinder signal through a principle-component-analysis filter to convert the standard deviation vector signal and the mean cylinder signal into said principle component value vector signal.

7. The method of claim 1, wherein said step of analyzing said principle component value vector signal comprises:
   passing said principle component value vector signal through a neural network to produce said classification signal indicating whether the engine is normal or faulty.

8. The method of claim 1, wherein said step of analyzing said principle component value vector signal comprises:
   passing said principle component value signal through a cluster-based classifier comprising:
      plotting said principle component value signal on a plot, wherein the origin of said plot represents a predetermined non-faulty engine and wherein a first predetermined value represents the inner radius (IR) distance from the origin and a second predetermined value represents the outer radius (OR) distance from the origin;
   determining the distance of said principle component value signal from the origin;
   producing a distance signal representing the distance of said principle component value signal from the origin;
   producing said classification signal based upon the distance of said principle component value signal from the origin, wherein the engine is non-faulty if the inner radius distance is greater than the distance of said principle component value signal, and wherein the engine is considered faulty if the distance of said principle component value signal is greater than the outer radius distance.

9. The method of claim 8, further comprising the steps of:
   passing said distance signal through a fuzzy logic classifier comprising:
      determining the engine's degree of membership in a fuzzy normal set, wherein if the distance is less than or equal to the inner radius then the engine is normal, if the distance is less than the outer radius and more than the inner radius, then the engine is marginally normal, and if the distance is greater than or equal to the outer radius, then the engine is not normal.

10. The method of claim 8, further comprising the steps of: passing said distance signal through a genetic program-derived classifier comprising:
   producing a signal representing the genetic score of the engine based on said distance signal; and
   comparing said genetic score to a threshold in memory, wherein if the genetic score is above said threshold then the engine is normal and if the genetic score is below said threshold then the engine is not normal.

11. A method for preprocessing diagnostic test measurements collected from a multi-cylinder internal combustion engine, comprising the steps of:
   cranking the engine at a predetermined speed for a predetermined number of revolutions;
   receiving a diagnostic cold-test measurement signal from the engine;
   passing the cold-test measurement signal through a median filter to produce a median filter vector signal having a plurality of vector points;
   passing the median filter vector through an averaging filter to produce a subsampled signal:
   partitioning the subsampled signal into segments corresponding to each cylinder event of an engine cycle to produce N subsampled signals, wherein N is the number of cylinders;
   passing each of the N subsampled signals through a mean filter to produce a mean cylinder signal equal to a mean of the N subsampled signals;

passing each of the N subsampled signals through a standard deviation filter to produce a standard deviation vector signal equal to the standard deviation of the N subsampled signals; and passing the standard deviation vector signal and the mean cylinder signal through a principle-component-analysis filter to convert the standard deviation vector signal and the mean cylinder signal into a principle component value vector signal.

12. The method of claim 11, further comprising the step of storing the principle component value vector signal in memory.

13. The method of claim 11, wherein said diagnostic cold-test measurement signal represents crankshaft torque in the engine.

14. The method of claim 11, wherein said diagnostic cold-test measurement signal represents intake pressure in the engine.

15. The method of claim 11, wherein said diagnostic cold-test measurement signal represents exhaust pressure in the engine.

16. A classification system for cold testing an internal combustion engine to determine whether the engine is faulty or normal, comprising:

means for monitoring an operational parameter of the engine while the engine is cranked at a predetermined speed for a predetermined number of revolutions, and for producing an electrical signal representing said operational parameter; and neural network means, coupled to said monitoring and producing means, for producing a classification signal indicating whether the engine is normal or faulty.

17. The classification system of claim 16, further comprising a cluster-based classifier means, coupled to said monitoring and producing means, for plotting a value of said electrical signal on a plot, wherein the origin of said plot represents a predetermined non-faulty engine, and for determining the distance of value from the origin, and for producing a distance signal representing the distance of said value from the origin, wherein the distance signal provides an indication whether the engine is normal or non-faulty.

18. The classification system of claim 17, further comprising a fuzzy logic means, coupled to said cluster-based classifier means, for determining the engine's degree of membership in a fuzzy normal set, wherein a first predetermined value represents an inner radius distance from the origin and second predetermined value represents an outer radius distance from the origin, wherein if the distance signal is less than or equal to an inner radius then the engine is normal, if the distance is less than the outer radius and more than the inner radius, then the engine is marginally normal, and if the distance is greater than or equal to the outer radius, then the engine is not normal.

19. The classification system of claim 18, further comprising a genetic program-derived classifier means, coupled to said cluster-based classifier means, for producing a signal representing the genetic score of the engine based on said distance signal, and for comparing said genetic score to a threshold in memory, wherein if the genetic score is above said threshold then the engine is normal and if the genetic score is below said threshold then the engine is not normal.

20. A classification system for testing an internal combustion engine to determine whether the engine is faulty or normal, comprising:

means for monitoring an operational parameter of the engine while the engine is cranked at a predetermined speed for a predetermined number of revolutions, and for producing an electrical signal representing said operational parameter;

cluster-based classifier means, coupled to said monitoring and producing means, the plotting a value of said electrical signal on a plot, wherein the origin of said plot represents a predetermined non-faulty engine, and for determining the distance of value from the origin, and for producing a distance signal representing the distance of said value from the origin, wherein the distance signal provides an indication whether the engine is normal or non-faulty.

* * * * *

UNITED STATES PATENT AND TRADEMARK OFFICE
CERTIFICATE OF CORRECTION

PATENT NO. : 5,361,628
DATED : November 8, 1994
INVENTOR(S) : Marko, et. al.

It is certified that error appears in the above-indentified patent and that said Letters Patent is hereby corrected as shown below:

Title page, col. 2, line 4, in the "Attorney, Agent, or Firm" delete: Sterne, Kessler, Goldstein & Fox and insert therein: Mark Mollon and Roger L. May--.

Signed and Sealed this

Second Day of January, 1996

Attest:

BRUCE LEHMAN

*Attesting Officer*       *Commissioner of Patents and Trademarks*